US010661372B2

(12) United States Patent
Ulrich et al.

(10) Patent No.: US 10,661,372 B2
(45) Date of Patent: May 26, 2020

(54) WELD PARAMETER INTERFACE

(71) Applicant: Illinois Tool Works Inc., Glenview, IL (US)

(72) Inventors: James F. Ulrich, Appleton, WI (US); Bruce Patrick Albrecht, Neenah, WI (US); Todd Earl Holverson, Appleton, WI (US)

(73) Assignee: Illinois Tool Works Inc., Glenview, IL (US)

(*) Notice: Subject to any disclaimer, the term of this patent is extended or adjusted under 35 U.S.C. 154(b) by 1177 days.

(21) Appl. No.: 14/089,062

(22) Filed: Nov. 25, 2013

(65) Prior Publication Data
US 2014/0144899 A1  May 29, 2014

Related U.S. Application Data

(62) Division of application No. 12/263,920, filed on Nov. 3, 2008, now Pat. No. 8,592,722.

(51) Int. Cl.
*B23K 9/095* (2006.01)
*B23K 9/10* (2006.01)

(52) U.S. Cl.
CPC .......... *B23K 9/0953* (2013.01); *B23K 9/1062* (2013.01); *B23K 9/1087* (2013.01)

(58) Field of Classification Search
CPC .. B23K 9/0953; B23K 9/1062; B23K 9/1087; B23K 9/1056
See application file for complete search history.

(56) References Cited

U.S. PATENT DOCUMENTS 5,063,282 A * 11/1991 Gilliland .............. B23K 9/1056
219/130.51
5,189,277 A *  2/1993 Boisvert .............. B23K 10/006
219/121.48
(Continued)

FOREIGN PATENT DOCUMENTS

DE         19602876 A1    7/1997
EP          903195 A1 *   3/1999
(Continued)

OTHER PUBLICATIONS

Rippey, Proceedings of NIST Workshop: Industry Needs in Welding Research and Standards Development, National Institute of Standards and Technology, Gaithersburg, MD, Apr. 1996.
(Continued)

*Primary Examiner* — Geoffrey S Evans
(74) *Attorney, Agent, or Firm* — McAndrews, Held & Malloy, Ltd.

(57) ABSTRACT

A system and method for determining settings or parameters for a welding-type power source are provided. By presenting an operator with an interface that is positioned along the path of a weld cable and configured to input weld characteristics, an operator is not required to determine electrical parameters for setting a welding-type power source output at the power source. The interface is presented to the operator at a remote welding-type device, such as a wire feeder, a weld robot, a torch, or the like. From the operator-specified weld characteristics, the system and method determine appropriate settings for the power source. In some embodiments, the system and method may automatically set the power source accordingly.

16 Claims, 5 Drawing Sheets

(56) References Cited

U.S. PATENT DOCUMENTS

| | | | |
|---|---|---|---|
| 5,990,445 A * | 11/1999 | Ogasawara | B23K 9/124 219/130.5 |
| 6,011,241 A | 1/2000 | Rongo | |
| 6,096,994 A * | 8/2000 | Handa | B23K 9/0953 219/130.5 |
| 6,315,186 B1 * | 11/2001 | Friedl | B23K 9/1062 219/130.1 |
| 6,476,354 B1 * | 11/2002 | Jank | B23K 9/0953 219/130.33 |
| 6,479,793 B1 * | 11/2002 | Wittmann | B23K 9/0953 219/130.5 |
| 6,552,303 B1 * | 4/2003 | Blankenship | B23K 9/0953 219/130.5 |
| 6,847,956 B2 | 1/2005 | Manicke | |
| 6,852,949 B2 | 2/2005 | Lanouette | |
| 7,180,029 B2 | 2/2007 | Ott | |
| 2003/0042288 A1 * | 3/2003 | Spear | B23K 9/1062 228/101 |
| 2004/0122550 A1 | 6/2004 | Klimko | |
| 2005/0071042 A1 * | 3/2005 | Subrahmanyam | B23K 31/02 700/212 |
| 2005/0173390 A1 * | 8/2005 | Lanouette | B23K 9/095 219/130.21 |
| 2005/0199605 A1 | 9/2005 | Furman | |
| 2005/0242076 A1 * | 11/2005 | Stava | B23K 9/1068 219/130.5 |
| 2005/0279742 A1 | 12/2005 | Stava | |
| 2006/0016792 A1 | 1/2006 | Uecker | |
| 2006/0043082 A1 * | 3/2006 | Martin | B23K 9/32 219/130.5 |
| 2006/0086706 A1 | 4/2006 | Ulrich | |
| 2006/0178778 A1 * | 8/2006 | Fuhlbrigge | B25J 9/1656 700/264 |
| 2006/0207980 A1 * | 9/2006 | Jacovetty | B23K 9/1062 219/130.5 |
| 2006/0213892 A1 * | 9/2006 | Ott | B23K 9/0953 219/132 |
| 2007/0000895 A1 | 1/2007 | Giese | |
| 2007/0051711 A1 * | 3/2007 | Kachline | B23K 9/1056 219/130.01 |
| 2007/0080154 A1 | 4/2007 | Ott | |
| 2007/0193983 A1 * | 8/2007 | Wiley | G02B 6/2551 219/121.59 |
| 2007/0262064 A1 * | 11/2007 | Daniel | B23K 9/0953 219/130.01 |
| 2007/0262065 A1 | 11/2007 | Peters | |
| 2007/0267394 A1 | 11/2007 | Beck | |
| 2009/0039064 A1 | 2/2009 | Enyedy | |
| 2009/0071949 A1 * | 3/2009 | Harris | B23K 9/1006 219/130.1 |
| 2010/0121472 A1 * | 5/2010 | Babu | B23K 9/02 700/104 |

FOREIGN PATENT DOCUMENTS

| | | |
|---|---|---|
| EP | 0903195 A1 | 3/1999 |
| EP | 987079 A2 * | 3/2000 |
| JP | 1158027 A | 3/1999 |
| JP | 11170048 A | 6/1999 |

OTHER PUBLICATIONS

International Search Report for application No. PCT/US2009/056328 dated Dec. 15, 2009.

Written Opinion for application No. PCT/US2009/056328 dated Dec. 15, 2009.

* cited by examiner

WELD PARAMETER INTERFACE

CROSS-REFERENCE TO RELATED APPLICATIONS

This application is a divisional of U.S. patent application Ser. No. 12/263,920, filed Nov. 3, 2008, now U.S. Pat. No. 8,592,722, entitled "Weld Parameter Interface" in the name of James F. Ulrich et al., which is incorporated herein by reference.

BACKGROUND OF THE INVENTION

The present invention relates generally to welding, and, more particularly, to a weld parameter interface system and method which calculate electrical requirements or other settings for a welding process from weld characteristics, such as a material to be welded, joint configuration, weld dimensions or other parameters. By allowing users to describe a weld to be performed rather than electrical requirements, the system and method of the present invention can simplify and/or automate the electrical calibration of a power source for a particular welding procedure.

As new advances in the welding arts develop, the level of user knowledge required to operate advanced welders has correspondingly increased. In other words, the more features and capabilities incorporated into a welder, the more an operator must learn or remember in order to utilize the new features and capabilities. Many present welding systems and power sources prompt a user to specify such settings as weld voltage, current, signal frequencies, and electrical operation modes like constant current (CC) and constant voltage (CV). Some systems even prompt a user to define particular welding power waveforms, in which case an operator must enter in such specific details as rise times, fall times, pulse widths, and the like.

In contrast, many weld operators are prone to understand welding processes in terms of the physical characteristics of the weld itself. It stands to reason that, since an operator is primarily concerned with making a weld, the operator will think of the welding procedure in terms of the weld itself and not in terms of power settings. That is, most operators will find it far easier to describe a welding process in terms of the workpiece materials, thicknesses, and weld joint types, rather than voltages, currents, and waveforms.

Requiring operators to learn electrical parameters and translate their weld description into electrical settings can diminish, to some extent, the advantages presented by technically advanced welding systems. When an operator must spend significant amounts of time in being constantly re-trained in new electrical settings or when an operator takes longer to adjust a new power source, the overall efficiency of a manufacturing process is reduced. Additionally, when experienced operators must be re-trained to think of weld settings in terms of electrical parameters, years of operator experience may be put to waste.

Some present systems have adjustment knobs or other interfaces located on the power source, so that users can adjust various power source settings in the field. Other systems utilize hand-held computers which are plugged directly into the power source for adjustment thereof These procedures may be inconvenient for an operator who is welding remotely from the power source. They use additional parts and connections, or require the operator to set down the torch, walk back to the power source to adjust settings, then walk back to the weld area. When an operator is located inside a ship hull, for example, walking back to a power source located outside the ship hull can present a very real inconvenience. Additionally, though these systems sometimes provide for some quasi-physical input settings, such as wire feed speed or material descriptions, such systems typically contemplate that operators will still be directly adjusting at least some electrical parameters.

It would therefore be desirable to have a system and method capable of translating an operator's weld-characteristic understanding of a welding procedure into particular optimal settings for a power source, such as electrical settings. It would further be desirable for such a system and method to include a simple, intuitive user interface which is integrated into a remote device, for reduced parts and complexity and ease of power source adjustment.

BRIEF DESCRIPTION OF THE INVENTION

The present invention provides a system and method for adjusting power source parameters which overcomes the aforementioned drawbacks. Embodiments of the present invention provide for adjustment/control of power source settings based on descriptions of a weld procedure to be performed. In addition, embodiments of the present invention include interfaces which are integrated into remote devices and present simple weld-term options, for increased simplicity.

Therefore, according to one aspect of the invention, a welding-type system includes a power source constructed to deliver a conditioned welding power on a weld cable, a peripheral device connected remotely from the power source along the path of the weld cable, and a user interface connected to the peripheral device. The weld cable defines a path from the power source to a welding electrode. Further, the user interface is adapted to input at least one weld attribute and communicate the at least one weld attribute to a processing unit. The processing unit determines a set of power source parameters from the at least one weld attribute and causes the power source to condition the welding power in accordance with the set of power source parameters.

In accordance with a further aspect of the invention, a welding-type user interface system includes a display comprising a set of control inputs configured to communicate weld specifications, a power receiver to receive electrical power from a weld cable to at least power the display, a processing unit programmed to convert the weld specifications from the set of control inputs into welding-type power source settings, and a transmitting unit configured to transmit the settings to a welding-type power source. The settings are used to adjust welding-type output power of the welding-type power source. Further, the weld cable couples the welding-type power source to a welding-type torch.

According to another aspect of the present invention, a method for setting welding parameters includes presenting a number of weld characteristic options on a user interface, wherein the user interface is connected to a welding-system device that is remote from a welding-type power conditioner, determining a set of electrical power source parameters based on user selection of particular weld characteristics, transmitting the set of power source parameters to a power source output controller, and conditioning welding-type power based on the set of power source parameters. The weld characteristics comprise physical attributes of a weld.

Various other features and advantages of the present invention will be made apparent from the following detailed description and the drawings.

DRAWINGS

The drawings illustrate one preferred embodiment presently contemplated for carrying out the invention.

DETAILED DESCRIPTION

The present invention finds applicability with all welding or weld-related systems including, but not limited to, systems utilizing power sources which are located remotely from the operator and the workpiece/weld. Therefore, embodiments of the invention will be discussed below with respect to systems which utilize wire feeders, weld robots, sophisticated torches, other user-adapted accessories, and the like. However, it is to be understood that the features and advantages described for a given welding-type system or configuration are equally applicable to other welding-type systems. For example, discussion of the present invention with respect to remote wire feeders shall be understood to extend to other remote devices equivalently.

Figure 1:
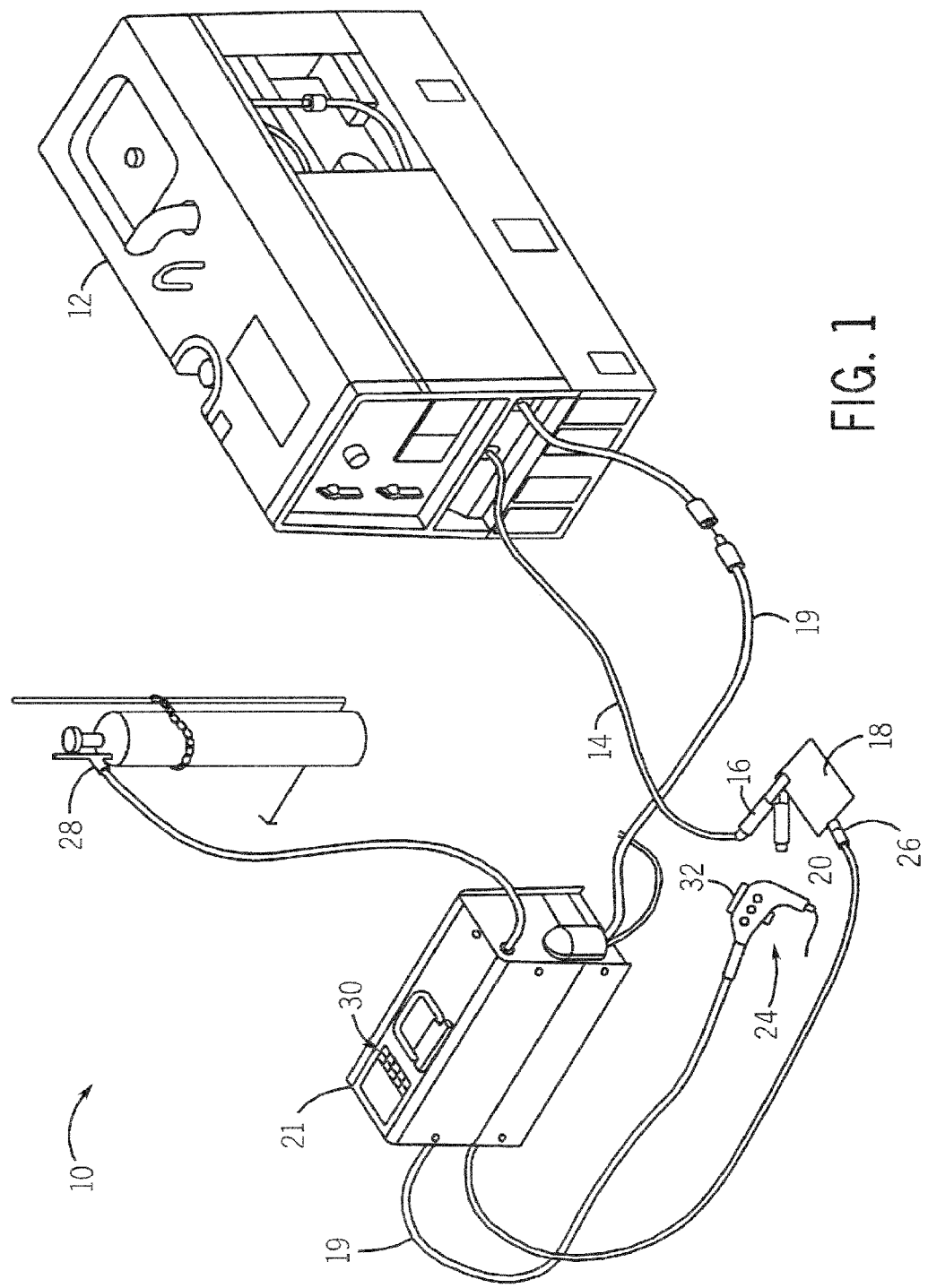
FIG. 1 is a perspective view of a welding system, in accordance with one embodiment of the present invention.

Referring to FIG. 1, a welding-type system 10 is shown incorporating the present invention. System 10 includes at least one power source 12, which can be an AC or a DC welding power supply operable in either a constant current (CC) or a constant voltage (CV) mode. The power source 12 has a work cable 14 and clamp 16 designed to connect power source 12 to a workpiece 18 for welding. A power cable 19 carries conditioned welding-type power from the power source 12 to a wire feeder 21. A welding cable 22 carries conditioned welding-type power from the wire feeder 21 to a welding-type electrode 20 extending from a gun or torch 24. As shown, the power source 12 can be connected, via the cables 19 and 22, to remote or peripheral devices such as the wire feeder 21 and the gun or torch 24. It is appreciated, however, that the present invention finds applicability in systems having remote or peripheral devices other than, or in addition to, wire feeder 21 and gun or torch 24. Preferably, wire feeder 21 is configured to drive consumable weld wire to a weld according to various operating modes. As shown, wire feeder 21 is a separate component from power source 12, though it is appreciated that wire feeder 21, or other remote devices, may be in a permanent configuration with power source 12. Wire feeder 21 includes a welding torch or gun 24 and a voltage sensing lead with clip 26 configured to provide voltage feedback from the weld to the wire feeder 21. A shielding gas cylinder 28 is also connected to the wire feeder 21, and includes a valve that is selectively activated to provide shielding gas for the welding process.

When welding torch 24 is triggered, welding wire is fed from wire feeder 21 toward the workpiece 18. As the wire approaches the workpiece 18, an electrical arc is established which generates current and voltage, causing the welding wire to be heated and melt to the workpiece 18, whereupon the welding wire fuses and cools with the workpiece 18. Because the electrical energy supplied at the weld is greater than that required to melt the welding wire, most of the remaining energy is in the form of heat which is transferred to the surface of the workpiece 18 resulting in the workpiece 18 also melting and improving bonding between the melted welding wire and the workpiece 18. As welding torch 24 is translated across workpiece 18, melted welding wire is continuously transferred to the workpiece 18.

Wire feeder 21 also has a user interface 30 integrated therewith, for selecting power source parameters. Interface 30 is shown as a graphical user interface (GUI), though it is appreciated that a physical interface comprising knobs and the like may equivalently be used. In embodiments where interface 30 is a GUI, interactivity with the GUI may be via a keyboard, keypad, touch screen, voice commands, knobs or dials, and/or a communication port for connectivity with other devices like laptop computers or hand-held devices (not shown). Similarly, torch 24 is shown having a physical interface 32 integrated thereon. Interfaces 30 and 32 may be used alternatively, or in combination, to allow an operator to specify characteristics of an impending weld. These weld characteristics may be translated into power characteristics and used to adjust power settings of power source 12. As such, an operator is saved from the inconvenience of having to return to power source 12 each time a change in the power source output is sought. User selections or inputs received by the interfaces 30, 32 may also cause changes in the operating mode of wire feeder 21.

Figure 2:
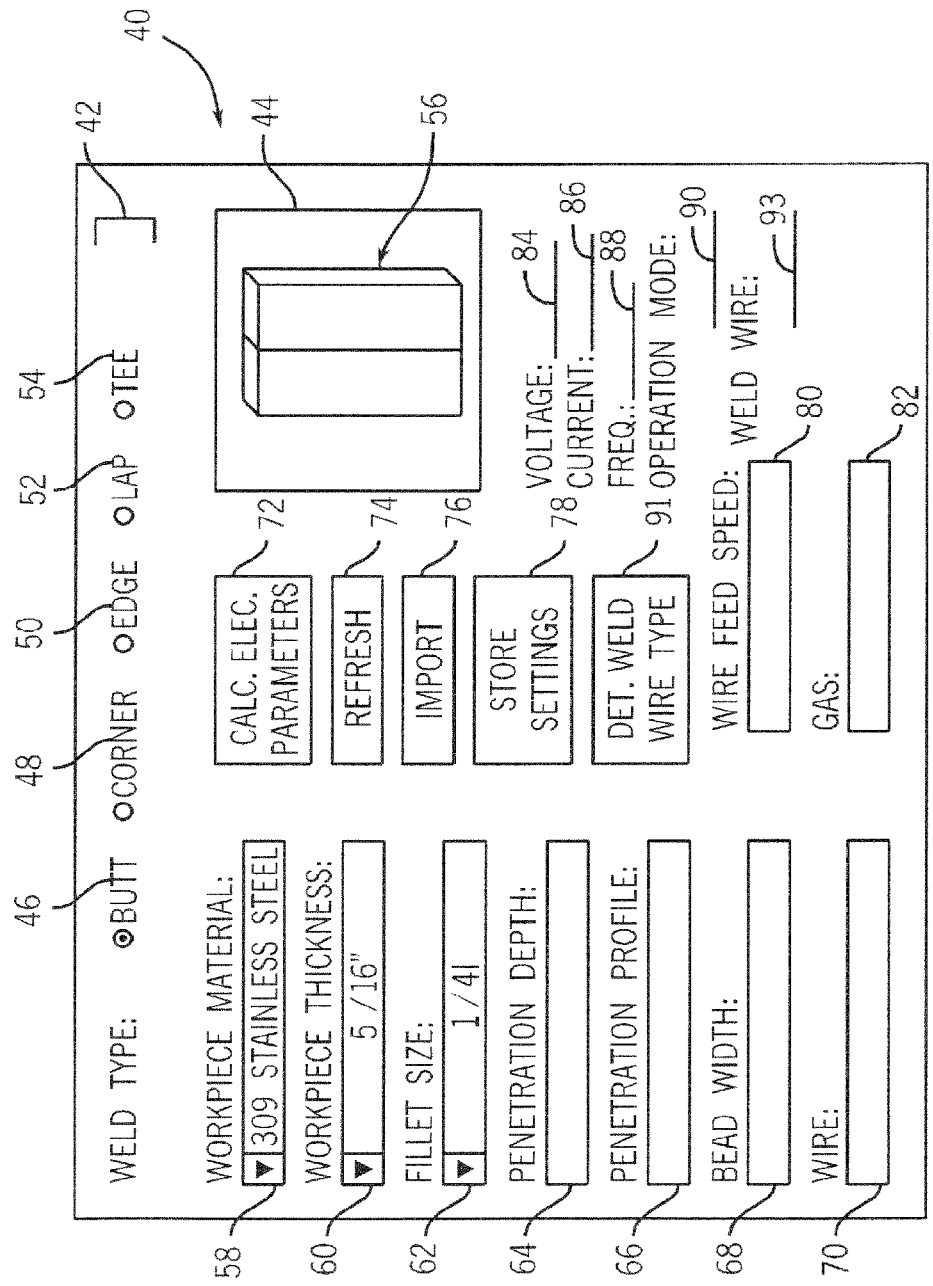
FIG. 2 is a diagram of an exemplary graphical user interface for the welding system of FIG. 1.

Referring now to FIG. 2, a more detailed view of a GUI is shown. GUI 40 may be presented on a display of a remote wire feeder, a torch, or other remote device. GUI 40 allows an operator to specify physical characteristics of a weld which the operator will be making, including welding materials, weld joint configuration parameters, and weld bead parameters. Based on the selected weld characteristics, a processor (e.g., processor 128, 138 of FIGS. 4 and 5, respectively) determines the electrical parameters which will be used to set the power source to achieve optimal weld conditions. The processor running the GUI 40 may automatically set the electrical parameters in the power source 12. Alternatively, the GUI 40 may simply display the electrical parameters to an operator for approval or manual setting.

GUI 40 is shown having a weld type or weld joint selection menu 42. An operator may specify that the impending weld is to have a "BUTT" joint 46, a "CORNER" joint 48, an "EDGE" joint 50, a "LAP" joint 52, a "TEE" joint 54, or other weld joint type. As shown, these selections are made via radio buttons, though it is appreciated that other conventions such as check boxes, drop-down boxes, or tabs may be used equivalently. When a user selects a weld type option, such as a BUTT joint 46, weld depiction window 44 will display a generalized view of the type of weld/joint which has been selected. As shown, a butt weld 56 is displayed in depiction window 44.

In addition, an operator may specify the type of workpiece material(s) via drop down menu 58. Thus, GUI 40 may be programmed to present a list of material types, such as various alloys, grades, and types of metals. In certain embodiments, GUI 40 may be pre-programmed to present only common or user-preferred material types. GUI 40 may be further programmed to automatically set default selections for each weld type. As an example, FIG. 2 illustrates the selection of a 309 Stainless Steel workpiece material. Similarly, GUI 40 allows a user to select a thickness of the workpiece(s). Preferably, GUI 40 will display, in drop down menu 60, a number of preferred or common material thickness options for the material type selected in menu 58. When an operator selects a workpiece material and thickness, the graphical display 56 of the weld can be automatically updated to reflect the chosen characteristics.

Text boxes 60-68 allow an operator to describe the weld itself, in terms of weld attributes or characteristics. These weld attributes can include, for example, the desired fillet size 62, penetration depth 64, penetration profile 66, and bead width 68. Thus, an operator can manually enter the desired characteristics, rather than selecting them from menus. It is appreciated, however, that other GUI conventions, such as menus and checkboxes may be used for inputting weld characteristics, or a click-and-drag type scalable control could be included in the GUI for increasing/decreasing a parameter value, such as the bead width. The weld attributes can also be shown in the weld depiction window 44, and the display can be modified as the weld attribute values are adjusted. Typically, welding operators will understand these characteristics better than the associated electrical parameters which will produce them. Depending upon the welding system type into which GUI 40 is integrated, GUI 40 may also present menus or text boxes 70, 80, and 82 for operators to specify wire types, wire feed speeds, and gas types, respectively.

GUI 40 also contains a number of command buttons 72-78. When an operator has specified the desired weld characteristics (or accepted the default characteristics), the operator may activate the "Calculate Electrical Parameters" button 72. The GUI will then determine and display the optimal electrical parameters by which to set the power source. These parameters may include a power source voltage setting 84, a power source current setting 86, a power source frequency 88, and an operation mode 90 (such as constant current CC, constant voltage CV, or pulse). Pulse parameters, such as a pulse width, rise time, and fall time could also be calculated. In applications where a wire feeder 21 is used, a wire feed speed may also be calculated (not shown). GUI 40 may also allow an operator to alter previously-selected weld characteristics and have the GUI redetermine electrical parameters 84-90, by activating the "Refresh" button 74.

In addition to being used to determine the optimal electrical parameters by which to set the power source, the desired weld characteristics input by a user can also be used in determining a proper weld wire type. That is, the input of the desired weld characteristics described above can be used for determining a composition, size, and/or brand of weld wire that is suitable for use with a peripheral wire feeder 21 (shown in FIG. 1) for the described welding operation. A "Determine Weld Wire Type" button 91, FIG. 2, is included on GUI 40 and, when an operator has specified the desired weld characteristics (or accepted the default characteristics), the operator may activate the "Determine Weld Wire Type" button 91. The GUI 40 will then determine and display the optimal weld wire type for use in the wire feeder and display this information at weld wire display 93.

An operator may also choose to import preset weld characteristics and/or electrical parameters by activating the "Import" button 76. Import button 76 may allow a user to retrieve previously saved sets of characteristics from local memory storage or to input weld characteristic from an outside data source. For example, weld characteristics may be uploaded directly from a CAD file or other architectural or engineering specification, a laptop computer, a hand-held device, or computer network. In other words, the user interface system may download or receive data from a schematic specification file from a computing-type device and use such data to determine the weld characteristics. The "Store Settings" button 78 may be used to create stored sets of characteristics from the current settings displayed GUI 40. These sets of weld characteristics can then be retrieved for quick parameter setting via the "Import" button 76.

Figure 3:
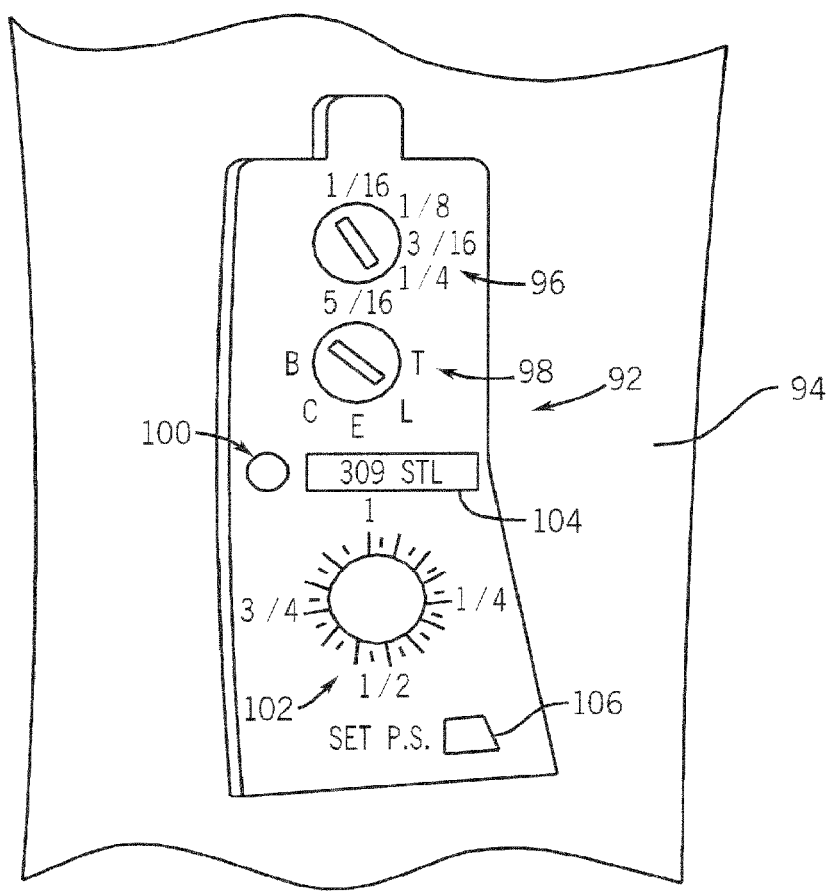
FIG. 3 is a diagram of an alternative user interface for the welding system of FIG. 1.

Referring now to FIG. 3, an alternative embodiment of a weld characteristic interface is shown. Interface 92 is less graphical than the interface of FIG. 2, and may be integrated into one or more remote devices such as weld torch handle 94. Having interface 92 located on, or coupled to, a remote device may increase work efficiencies. That is, since an operator will no longer need to move to a welding-type power conditioner to adjust power conditioning power settings, the length of work flow interruptions may be minimized. In this less graphical embodiment, interface 92 includes a number of physical controls, such as knobs, buttons and dials 96-102 which present weld characteristic options to an operator. It will be appreciated that the number, size, and arrangement of controls 96-106 may vary and may depend upon the type of torch handle or other remote device into which interface 92 is integrated. Interface 92 may also have a cover (not shown) to enclose the controls 96-106 during a welding operation, to prevent inadvertent changes to weld characteristic settings.

Interface 92 has a weld/joint type selector knob 98, by which an operator may designate the impending weld as a butt joint "B," a corner joint "C," an edge joint "E," a lap joint "L," or a tee joint "T." In various embodiments, knob 98 may be a hand-turnable knob or a screw driver-turnable knob. In a similar manner, an operator may also specify the dimensions of the weld by turning knob 96. Weld dimension knob 96 may specify the weld fillet size, penetration depth, bead width, or other similar characteristics. Additional knobs (not shown) may also be present on interface 92 to permit operators to specify more or all of these dimensions. The type of workpiece material may be selected in a number of ways. As shown, interface 92 includes a small LCD display 104 and a scroll button 100. By depressing button 100, display 104 will scroll through a list of workpiece material types, until the desired material type is shown. Alternatively, it is appreciated that other controls, such as switches, could be used to select workpiece material types.

Interface 92 may set electrical parameters in the power source connected to the remote device 94 in a number of ways. For example, interface 92 may register changes to weld characteristics only prior to commencement of a weld operation, and may therefore allow an operator to only manually adjust power source parameters during a weld operation. In addition, interface 92 may only set electrical parameters after a user has specified all the desired weld characteristics. In this manner, interface 92 may have a "Set Power Source" button 106. Alternatively, interface 92 may simply adjust power source parameters in real time as the weld characteristics are changed.

Figure 4:
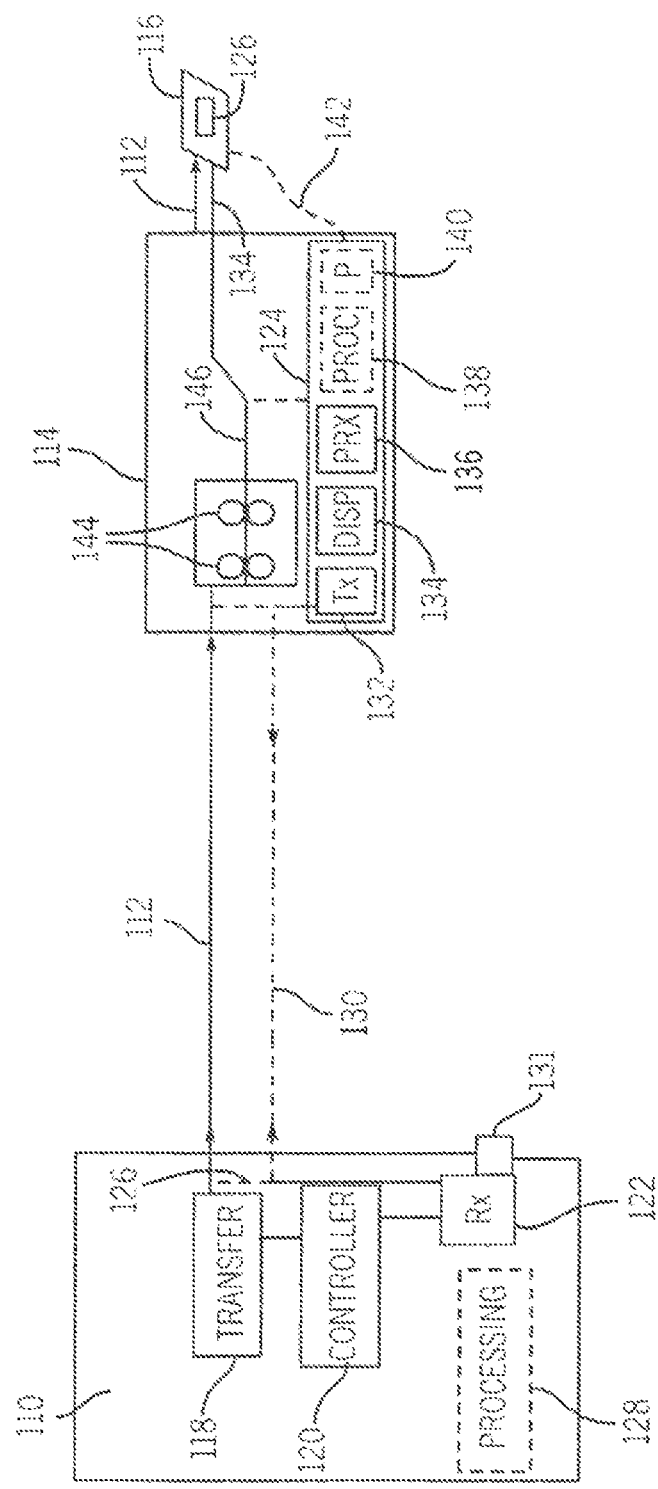
FIG. 4 is a schematic block diagram of the connectivity between a welding-type power source and a user interface system of a remote device in accordance with one embodiment of the invention.

Referring now to FIG. 4, a schematic block diagram conceptually illustrating the connectivity between a power source and a user interface system of a peripheral device is shown. Power source 110 provides conditioned power via a weld cable 112, which in the present embodiment is connected to wire feeder 114 and torch 116. Generally, power source 110 includes a primary transformer 118 to condition welding-type power, a power output controller 120 to control the output of transformer 118, and a receiver 122 to receive operator-selected data and communicate the data to controller 120. In some embodiments, receiver 122 may receive weld characteristics from a user interface system such as interface system 124 of wire feeder 114 or interface system 126 of torch 116. In such embodiments, receiver 122 will communicate the weld characteristics to a processing unit 128 of power source 110 for the determination of power source electrical parameters. Receiver 122 may be configured to receive input data via weld cable 112 or data cable 130, or it may be configured to allow for wireless communication via antenna 131.

Processing unit 128, or an associated memory component (not shown), may have stored thereon a lookup table or a set of conditions and constraints by which electrical parameters are determined That is, a lookup table or database of electrical parameters may be parsed according to the user-selected weld characteristics. Such a lookup table may be determined and stored in processing unit 128 by the manufacturer of power source 110. Alternatively, the electrical parameter values in the lookup table may be saved or altered by an operator, to personalize the electrical parameter determination. In this regard, more than one lookup table may be stored on processing unit 128, such that multiple operators may store their own individualized electrical parameter profiles.

For example, an operator at the remote device 114 could enter an operator ID instructing the processing unit 128 which profile to use. Then, the operator could specify a given weld joint type, material type, material thickness, weld profile, etc. Using these characteristics, the processing unit 128 will parse the lookup table and find a set of electrical parameters which have been stored as the optimal parameters to achieve the specified weld. Stored electrical parameters may include particular weld voltage, weld current, frequency, operation mode settings, and the like. These settings may then be communicated to the controller 120 for adjustment of the power source output. Accordingly, some degree of operator guesswork can be removed from power source electrical settings.

Processing unit 128 may also be configured to begin with pre-set default electrical parameters, if no weld characteristics are specified by a user. When an operator alters a weld characteristic, processing unit 128 may then determine whether one or more electrical settings of the power source 110 need to be adjusted.

Positioned along the path of weld cable 112, user interface system 124, seen as part of the wire feeder 114 (i.e., a peripheral welding-type device), allows for the input and communication of weld characteristics. As shown in the present embodiment, user interface system 124 includes a transmitter 132, a display 134, and power receiver 136. In the present embodiment, the power receiver 136 receives power via the weld cable 112 to at least power the display 134. It is contemplated that the interface system 124 may also include a processor 138 and a port or data receiver 140. The port or data receiver 140 can be used to download weld information from a remote computing-type device. As such, it is contemplated that port or data receiver 140 could take on the form of a plug-in receptacle if a data link (not shown) is used for downloading or an antenna if downloading is to occur wirelessly. The transmitter 132 is configured to send operator-selected weld characteristics from interface 124 to power source 110. Alternatively, weld characteristics may be communicated from interface system 126 of torch 116 to transmitter 132 via a separate data cable 142. Transmitter 132 may be configured to transmit the operator-specified weld characteristics wirelessly, via weld cable 112, or via a separate data cable 130.

The operator-specified weld characteristics are preferably communicated to the receiver 122 of power source 110 via the weld cable 112. Such communication may, for example, take the form of a modulation and/or encoding of a power signal on the weld cable 112, or be performed by a separate digital or analog serial protocol. Exemplary methods and systems for providing communications via a weld cable are described in U.S. Patent Application Publication 2006/0086706, published Apr. 27, 2006, U.S. Pat. No. 7,180,029, issued Feb. 20, 2007, and U.S. Patent Application Publication 2007/0080154, published Apr. 12, 2007, all of which are hereby incorporated by reference for their disclosure of such methods.

However, although communications can be provided through the weld cable 112, it may be desirable in other embodiments to include separate data cable 130 to communicate weld characteristics to power source 110. For example, bandwidth, impedance, or noise constraints may make a separate cable more desirable. Or, in instances where embodiments of the invention are used as retrofits to existing welding-type systems, a separate data cable 130 may be easier to implement. In such embodiments, data cable 130, rather than weld cable 112, may be used to power at least display 134 of power interface system 124. Additionally, and as discussed above, the interface system (e.g., interface system 124 and 126) of the accompanying remote device (e.g., wire feeder 114 and gun or torch 116, respectively) may include an antenna for wireless communication.

As mentioned above, in an alternative embodiment, user interface system 124 may also include an on-board processing unit 138. In such an embodiment, the electrical parameter determinations may be conducted by the on-board processing unit 138 of the user interface system 124 connected to, or incorporated into, wire feeder 114 (or another remote device such as torch 116). Accordingly, communication of the electrical parameters may be accomplished wirelessly, via the weld cable 112, and/or via the data cable 130, obviating a need for a processing unit 128 in the power source 110.

On-board processing unit 138 can also control additional weld settings, such as wire feed speed. As shown, wire feeder 114 has a set of rollers 144 for advancing a consumable weld wire 146 to a gun or torch 116. As such, based on an operator specified weld joint type, material type, material thickness, weld profile, etc., the on-board processing unit 138 can determine an optimal wire feed speed and communicate this value to wire feeder 114. It is also envisioned that on-board processing unit 138 could control travel speed (if the welding process is automated), by determining an optimal welding speed and relaying this value to a fixed automation system or robot, such as a computer-numerical control (CNC) robot welder (not shown).

It is contemplated that the user interface system may be a component affixed to or incorporated into a peripheral device such as wire feeder 114 and/or torch 116. However, it is also contemplated that user interface system may be comprised of multiple components (e.g., a separate transmitter 132, display 134, power receiver 136, processor 138, and port or data receiver 140) that are each affixed and/or incorporated into a peripheral device (e.g., wire feeder 114 and torch 116) along the weld cable 112 path. In either case, the interface system allows for a power source to be set or adjusted in an efficient and intuitive manner.

As discussed above, it is also contemplated that an interface may be coupled to welding-type devices other than a wire feed 114 or torch 116. For example, it is envisioned that user interface 132 could be implemented as part of a welding robot (not shown) along a weld cable path and in communication with power source 110. Here, the receiver 122 in power source 110 can be a wireless communications device capable of connecting the power source to a wireless communications network, a connector such as an Ethernet connector for connecting the power source to a local area or wide area network, or a communications device capable of TCP/IP communications with a computer through an internet link. In any of these cases, data entered into an interface system of the robot is transmitted to the receiver 122 in power source 110, and to the wire feeder 114. Based on operator input of weld characteristics or attributes, power source electrical parameters may be determined at the robot and transmitted to the power source 110, or may be determined at the processing unit 128 in power source. As such, work efficiencies can be maximized.

Furthermore, although the system is described above for use with a metal inert gas (MIG/GMAW) or pulsed MIG system, it will be apparent that the invention described herein also has application to other types of welding applications, including tungsten inert gas (TIG/GTAW) shielded metal arc welding (SMAW or stick welding), flux cored arc welding (FCAW), and other applications.

Figure 5:
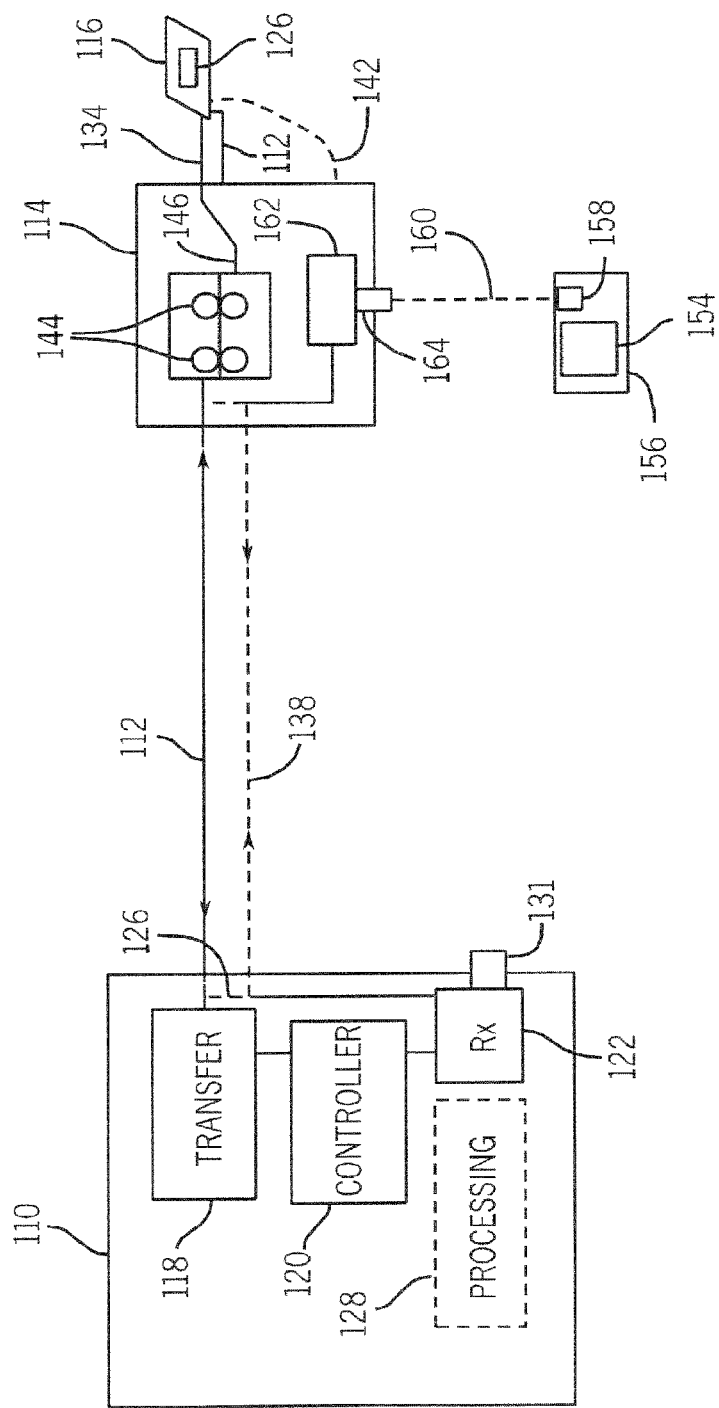
FIG. 5 is a schematic block diagram of the connectivity between a welding-type power source and a user interface system of a remote device in accordance with another embodiment of the invention.

Referring to FIG. 5, in an alternate embodiment to that shown in FIG. 4, an operator interface may be implemented as an interface 154 on separate handheld remote 156 wirelessly connected to wire feeder 114. Handheld remote 156 includes a transmitter 158 therein to send operator-selected weld characteristics from interface 154 to wire feeder 114 via wireless communication signals 160. Wireless communication signals 160 are received by processor 162 via antenna 164 and the weld characteristics contained in the wireless communication signals 160 are processed by processing unit 162 to determine power source electrical parameters. Interface 154 wirelessly connected 160 to wire feeder 114 may be implemented as a stand-alone interface or be used in conjunction with interface 146 on torch 116. Additionally, it is also envisioned that interface 154 could be implemented as part of a networked computer in wireless communication with wire feeder 114 rather than being in the form of handheld remote 156.

Accordingly, an interface remote from a power source has been described in a number of embodiments for determining and/or automatically setting electrical power source parameters from operator-supplied weld characteristics.

In accordance with one embodiment, a welding-type system includes a power source constructed to deliver a conditioned welding power on a weld cable, a peripheral device connected remotely from the power source along the path of the weld cable, and a user interface connected to the peripheral device. The weld cable defines a path from the power source to a welding electrode. Further, the user interface is adapted to input at least one weld attribute and communicate the at least one weld attribute to a processing unit. The processing unit determines a set of power source parameters from the at least one weld attribute and causes the power source to condition the welding power in accordance with the set of power source parameters.

According to another embodiment, a welding-type user interface system includes a display comprising a set of control inputs configured to communicate weld specifications, a power receiver to receive electrical power from a weld cable to at least power the display, a processing unit programmed to convert the weld specifications from the set of control inputs into welding-type power source settings, and a transmitting unit configured to transmit the settings to the welding-type power source. The settings are used to adjust welding-type output power of the welding-type power source. Further, the weld cable couples the welding-type power source to a welding-type torch.

In accordance with a further embodiment, a method for setting welding parameters includes presenting a number of weld characteristic options on a user interface, wherein the user interface is connected to a welding-system device that is remote from a welding-type power conditioner, determining a set of electrical power source parameters based on user selection of particular weld characteristics, transmitting the set of power source parameters to a power source output controller, and conditioning welding-type power based on the set of power source parameters. The weld characteristics comprise physical attributes of a weld.

The present invention has been described in terms of the preferred embodiment, and it is recognized that equivalents, alternatives, and modifications, aside from those expressly stated, are possible and within the scope of the appending claims.

What is claimed is:

1. A welding-type user interface system comprising:
   a user interface configured to display and receive a plurality of control inputs indicative of a plurality of weld specifications, wherein the plurality of weld specifications comprise one or more physical attributes of a weld;
   a transmitter configured to transmit the plurality of control input to a welding power source; and
   a processor configured to convert, using a lookup table, the weld specifications from the plurality of control inputs into electrical parameters of a welding power source and a type of weld wire, and to control an output welding power of the welding power source based at least in part on the electrical parameters.

2. The welding-type user interface system of claim 1 wherein the processing unit is further programmed to determine the electrical parameters using only the weld specifications as inputs.

3. The welding-type user interface system of claim 1 wherein the transmitting unit is further configured to transmit the plurality of control inputs via at least one of a weld cable, a communications cable, and an antenna.

4. The welding user interface system of 1 wherein the processing is programmged to store a set of default welding power source settings and automatically adjust one or more of the default welding power source settings when a user adjusts one control input of the plurality of control inputs.

5. The welding user interface system of claim 1 wherein the welding user is configured to display at least one of an image of a selected weld and the electrical parameters to a user for approval, and wherein the weld specifications are determined from a computer aided design (CAD) file downloaded from one of a computer network and a handheld computing device.

6. The welding user interface system of claim 1, comprising a power receiver configured to receive electrical power from the welding power source via a weld cable, and to power the user interface using the received electrical power.

7. The welding user interface system of claim 1, comprising a handheld device that comprises the user interface and the transmitter.

8. The welding user interface system of claim 1, wherein the transmitter is further configured to transmit the plurality of control inputs wirelessly.

9. A method for setting welding parameters comprising:
   receiving, via a user interface, a plurality of control inputs indicative of a plurality of weld characteristics, wherein the plurality of weld characteristics comprise one or more physical attributes of a weld;

determining, using a first lookup table, a set of power source parameters based on the received plurality of control inputs;

determining, using the first lookup table or a second look-up table, a type of weld wire based on the received plurality of control inputs;

outputting an indication of the type of weld wire via the user interface;

transmitting the set of power source parameters to a power source output controller; and conditioning welding-type power based on the set of power source parameters.

10. The method of claim 9 wherein the welding device is at least one of a wire-feeder and a welder-type gun.

11. The method of claim 9 further comprising storing the set of power source parameters as a set of default parameters for future use.

12. The method of claim 9 further comprising displaying the set of power source parameters for approval prior to transmitting the set of power source parameters to the power source output controller.

13. The method of claim 9 further comprising determining the set of power source parameters from only the particular weld characteristics.

14. The method of claim 9, comprising powering the user interface using electrical power received from a welding power source via a weld cable.

15. The method of claim 9, wherein the user interface is connected to a handheld device.

16. The method of claim 15, comprising transmitting the plurality of control inputs from the handheld device.

* * * * *